No. 718,750. PATENTED JAN. 20, 1903.
H. H. DREYER.
TRIGGER TONGUE FOR TRAPS.
APPLICATION FILED JUNE 30, 1902.
NO MODEL.

WITNESSES:

INVENTOR
Harry H. Dreyer
BY
ATTORNEYS.

THE NORRIS PETERS CO., PHOTO-LITHO., WASHINGTON, D. C.

UNITED STATES PATENT OFFICE.

HARRY H. DREYER, OF SENTINEL BUTTE, NORTH DAKOTA.

TRIGGER-TONGUE FOR TRAPS.

SPECIFICATION forming part of Letters Patent No. 718,750, dated January 20, 1903.

Application filed June 30, 1902. Serial No. 113,780. (No model.)

*To all whom it may concern:*

Be it known that I, HARRY H. DREYER, a citizen of the United States, and a resident of Sentinel Butte, in the county of Billings and State of North Dakota, have invented a new and Improved Trigger-Tongue for Traps, of which the following is a full, clear, and exact description.

The purpose of the invention is to so construct a trigger-tongue for traps that the trap when set may be covered by earth, leaves, and the like without interfering with the trip action of the tongue, which is so shaped in cross-section that it will sink in the ground under a very light weight and will offer a knife-edge to the surface of the ground, thus preventing stones, chips, &c., from interfering with its action and insuring the springing of the trap when the animal is above the tongue at any point in its length or breadth.

Another purpose of the invention is to so construct the tongue as to offer a maximum of surface to the animal to be trapped.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
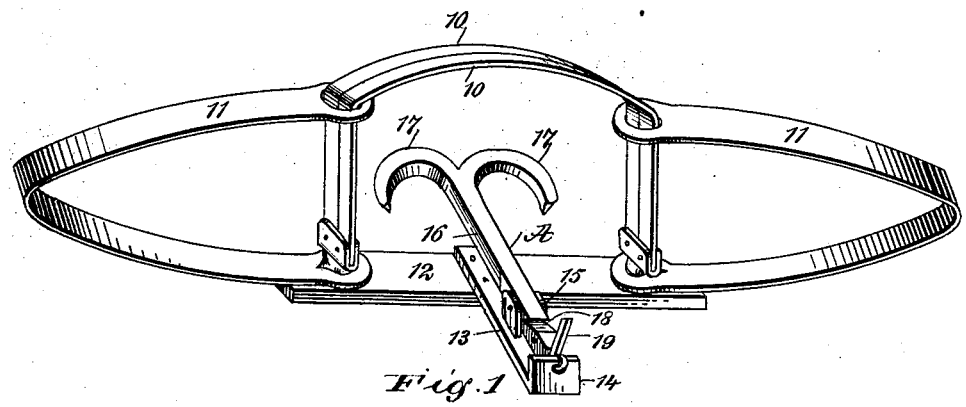
Figure 2:
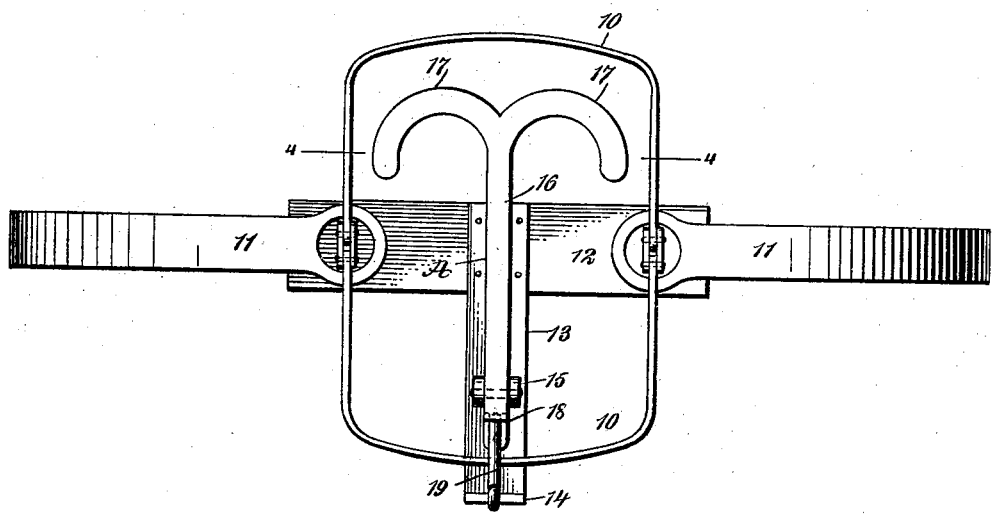
Figure 3:
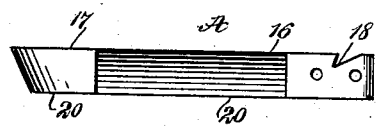
Figure 4:
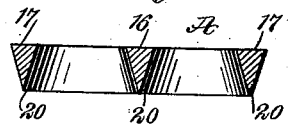

Figure 1 is a perspective view of a closed trap and the improved trigger-tongue applied thereto. Fig. 2 is a plan view of the trap and tongue, the trap being open. Fig. 3 is a side elevation of the trigger-tongue; and Fig. 4 is a transverse section through the tongue, taken practically on the line 4 4 of Fig. 2.

The improved trigger-tongue A may be applied to any style of trap, but particularly to the style of trap illustrated, which is usually covered when set and placed upon the ground. The trap consists of hinged jaws 10, adapted to open in opposite directions, which jaws are controlled by opposing bow-springs 11. The jaws have a hinged connection with a base 12. A horizontal arm 13 extends from the base, terminating at its outer end in a vertical member 14, and bearings 15 are located on said arm between its ends, between which bearings the trigger-tongue A is pivoted near its trigger end.

The trigger A consists of a body-section 16 and terminal branch sections 17. The body-section 16 is usually straight and is of any desired length and breadth, being provided near its trigger end with an undercut notch 18 to receive a locking-pin 19 when the jaws are opened for the purpose of holding the jaws in their open position, and at such time the locking-pin extends across the bow portion of one of the jaws, as is shown in Fig. 2. The locking-pin 19 is pivoted to the vertical member 14 of the base-arm 13. The branch sections 17 of the tongue A are at an end of the body-section 16 opposite its trigger end and are curved from said extremity of the body-section in direction of each other at opposite sides of the body-section and in direction of the trigger end of the latter. If desired, other branches may be formed near the trigger end of the body. In cross-section the sides of each portion of the body, with the exception of the pivot portion and trigger end, are inclined downward in opposite directions, forming a sharp bottom or a bottom knife-edge 20, capable of readily entering the ground under the slightest pressure and offer but little surface for the retarding action of small stones, chips, bark, or other articles which may be accidentally left beneath the tongue, thereby materially adding to the efficiency of the trap, since when the tongue A is depressed it releases the locking-pin 19, and said pin releases the jaws 10, which are instantly closed by the springs 11. The proper length of the tongue is such that it will be wholly within the space bounded by the jaws 10 when said jaws are opened out to a horizontal position, as is shown in Fig. 2, and the branches from the body of the tongue greatly enhance the liability of an animal pressing on the tongue while prowling around the trap.

Having thus described my invention, I claim as new and desire to secure by Letters Patent—

1. A trigger-tongue for a trap, provided with a bottom knife-edge and having its sides inclined from the upper surface to said knife-edge, whereby the said trigger-tongue will readily enter the ground when pressed upon and will offer little resistance to ordinary obstructions which may be beneath it.

2. A trigger-tongue for traps, consisting of a body-section and branches extending from opposite sides of the body-section, which branches and the major portion of the body of the tongue have their sides downwardly inclined in opposite directions, forming a bottom knife-edge for said portions of the tongue, as described.

3. A trigger-tongue comprising a body having means at one end to receive a locking member of the trap, and branches from its opposite end, curved at each side of the body and in the direction of the trigger end thereof, the sides of the body from a point near the trigger end, and the sides of the branches of the body, being downwardly and inwardly inclined, forming a bottom knife-edge at such portions of the trigger, for the purpose set forth.

In testimony whereof I have signed my name to this specification in the presence of two subscribing witnesses.

HARRY H. DREYER.

Witnesses:
HENRY GILBERT,
EDDIE GILBERT.